United States Patent [19]

Podola et al.

[11] Patent Number: 4,484,057
[45] Date of Patent: Nov. 20, 1984

[54] RESISTANCE FLASH BUTT WELDING PROCESS MONITOR

[75] Inventors: Nikolai V. Podola; Vadim P. Krivonos; Boris L. Grabchev; Evgeny I. Dovgodko; Alexandr M. Kobylin, all of Kiev, U.S.S.R.

[73] Assignee: Institut Elektrosvarki Imeni E.O. Patona Akademii Nauk Ukrainskoi SSR, Kiev, U.S.S.R.

[21] Appl. No.: 339,677

[22] Filed: Jan. 15, 1982

[51] Int. Cl.³ .................................. B23K 11/04
[52] U.S. Cl. .................................. 219/109; 219/101
[58] Field of Search ............... 219/108, 109, 97, 100, 219/101, 104

[56] References Cited

U.S. PATENT DOCUMENTS

| | | | |
|---|---|---|---|
| 3,151,290 | 9/1964 | Riley et al. | 219/108 |
| 3,748,431 | 7/1973 | Melbard et al. | 219/97 |
| 3,980,857 | 9/1976 | Sciaky | 219/97 |

FOREIGN PATENT DOCUMENTS 465292  3/1975  U.S.S.R.

Primary Examiner—C. C. Shaw
Attorney, Agent, or Firm—Murray Schaffer

[57] ABSTRACT

The apparatus comprises a current transformer coupled to the welding transformer primary and connected with an analog transmitter of the welding current and with a digital transmitter of the duration of short-circuits in the welding circuit, having a memory element at the output. The apparatus further includes an analog voltage transmitter coupled to the welding transformer primary, digital transmitters of the slip of the workpieces being weld-joined with memory elements at the outputs, installed in the machine clamps, a digital transmitter of the offset of the rod of the servo-operated control valve with respect to its housing, having a memory element at the output, an analog transmitter of the displacement of the machine's movable column, an analog transmitter of the fusion rate, as well as a device for digital recording of welding process variables, electrically connected to a first output of the programming device and including a commutator of analog signals, an analog-to-digital converter, an interface, a microprocessor, and a digital printer, all coupled in series. According to the invention, the apparatus incorporates a set of flip-flops whose number equals that of the control commands, univibrators, and an OR-gate whose inputs are electrically coupled via the corresponding univibrators to outputs of the flip-flops and to a second output of the programming device and whose output is coupled to the triggering input of the interface, and two encoders. The recording device additionally comprises an OR-gate which accomplishes an electric coupling of the outputs of the analog-to-digital converter and encoders with the information input of the interface. The inputs of one encoder are coupled to the outputs of the digital transmitters, the inputs of the other encoder are coupled to a third output of the programming device, and the control inputs of both encoders and of the commutator of analog signals are coupled to the address bus of the interface.

1 Claim, 2 Drawing Figures

RESISTANCE FLASH BUTT WELDING PROCESS MONITOR

BACKGROUND OF THE INVENTION

1. Field of the Invention

The present invention pertains to the art of welding and is specifically concerned with an apparatus for monitoring the process of resistance flash butt welding.

The invention may find application in machines for continuous resistance flash butt welding mainly of critical workpieces, such as rails and pipes, where higher demands upon the welding quality are placed.

2. Description of the Prior Art

Used as the criterion for evaluating the quality of resistance butt welded joints most often is the conformity of the welding variables with the preset values. The most extensive application has been gained by apparatus with whose aid the welding variables are recorded on a recorder chart and subsequently compared by the operator against a reference. The accuracy of such a control method is largely dependent on a subjective evaluation of the variables by an operator and, because of a slow response of a recorder, fails to reveal short-time interruptions in the process before the upsetting.

Among known apparatus for monitoring the resistance flash butt welding process, best results are offered by such devices which automatically record deviations of the welding variables from specified values (see, e.g., U.S. Pat No. 3,151,290; USSR Inventor's Certificate No. 465,292).

Such apparatus comprise a current transformer, which serves as a current transmitter, a transmitter of the duration of welding circuit short-circuits with a memory element at the output, and an indicating and signalling device which indicates an excess in the duration of the short-circuit before the upsetting of the preset value.

The above-described apparatus, however, monitors the welding process only at its final stage and is incapable of giving complete information on the conformity of the actual values of welding variables with the program of their variation at different stages of fusion. Besides, such apparatus retains the information regarding deviation from the preset welding conditions (going-on of pilot lamps) only till the next welding operation. Therefore, in welding critical workpieces, such as pipings, rails, etc., the use of such apparatus cannot provide a basis for the issuing of a certificate for a welded joint in the form of a digital record of welding process variables.

On the other hand, it should be noted that, while being greatly complex, the construction of modern resistance butt welding machines makes it possible at the same time to derive, either indirectly or directly, various information on the welding process variables. For example, pipes and rails are welded in a machine which has clamps wherein the workpieces to be joined together are installed. One of the clamps is fixed to a movable column which in the course of welding is moved towards a stationary column to bring together the workpieces being weld-joined. The movement of the movable column is controlled by an electrohydraulic actuator with a servo-operated control valve whose rod moves relative to the valve housing. The machine has also other actuators and mechanisms, such as for horizontal and vertical alignment of the workpieces being welded, for removing the metal squeezed out in upsetting, on completion of welding (flash trimmer), etc. The machine incorporates a welding transformer whose primary circuit comprises controlled rectifiers and a current transformer. The above-described machine will hereinafter be referred to as "the machine of said type". In addition, the machine of said type includes an apparatus for monitoring the welding process, which comprises transmitters of the variables being monitored, the transmitters' outputs being coupled to a digital recorder. The transmitters include an analog welding current transmitter coupled to the current transformer's measuring winding, an analog voltage transmitter coupled to the welding transformer primary, an analog transmitter of movable column movement, which may take the form of, e.g., a linear potentiometer, a fusion rate transmitter coupled to armature terminals of the motor of the servo actuator of the moving column, a digital transmitter of welding circuit short-circuit duration with a memory element at the output, coupled to the current transformer, a digital transmitter of offset of the servo-operated control valve rod with respect to the valve housing, as well as digital transmitters of slip of the workpieces being welded, installed in the clamps of both columns.

A programming device employed in this machine comprises a shaper of pulses synchronized with the power supply voltage, a divider of the frequency of the pulses, a welding duration counter, a decoder, a welding program selection unit, a welding initiation flip-flop controlled from a pushbutton, and a set of output flip-flops intended to deliver commands to the machine's actuators mentioned above.

The input of such a programming device is connected to the power mains; the output of the welding duration counter, denoted for the purpose of the present description as the first output, serves to deliver a digital signal which characterizes the time elapsed from the initial moment of welding; one of outputs of the set of output flip-flops, denoted as a second output, serves to deliver a command for changing the effective voltage across the welding transformer primary. The plurality of the remaining outputs of the set of output flip-flops are all designated as a third output; they serve to deliver commands to the above-mentioned actuators of a machine of said type. The output of the welding program selection unit is hereinbelow referred to as the fourth output of the programming device.

The digital recorder includes a commutator of analog signals incoming from the transmitters, an analog-to-digital converter, an interface, a microprocessor with a keyboard entry of a program, a transcriber, and a digital printer.

The apparatus for monitoring the continuous resistance flash butt welding process in the machine of said type functions as follows.

A program for processing the information incoming from the transmitters is entered beforehand into the microprocessor. The pushbutton is depressed to actuate the welding initiation flip-flop in the programming device, and voltage is applied to the welding transformer and to the electrohydraulic actuator of the movable column. A signal for starting the monitoring apparatus is produced simultaneously. A first interrogation of transmitters is carried out, and from its results the information on the set values of the initial voltage at the welding transformer, the no-load current of the welding transformer, the initial rate of fusion, and the initial position of the movable column is printed out. Further interrogations or scannings of the transmitters in the course of welding result in printing out the running value of the welding process variables being monitored.

The number of measurements per a welding cycle is selected depending on the complexity of the program of variation of the process variables. In the prior art apparatus, recording the welding variables is limited to measuring only analog signals, which is insufficient for evaluating the accuracy of implementing the preset welding conditions. For example, in the event of slip of the workpieces in the machine clamps, the linear amount of upsetting cannot be reliably evaluated from the data on the amount of movement of the movable column. The data obtained from digital transmitters is used solely for indication and not retained. Also, the upsettings of welding conditions, caused by short-circuits in the welding circuit at the final stage of fusion, may happen to be not recorded if they have occurred in time between successive transmitter interrogation cycles. Moreover, when a short-circuit coincides in time with a transmitter interrogation cycle, the short-circuit occurrence itself can be detected from the value of the welding current, but the amount of exceeding of the permissible duration of welding process interruption cannot be evaluated.

Further, this apparatus fails to monitor the running time of the welding and hence makes it impossible to evaluate the conformity of variation of the welding process varibles at preset time moments.

SUMMARY OF THE INVENTION

The primary object of the present invention is to provide an apparatus for monitoring continuous resistance flash butt welding process variables in a machine of said type, which makes it possible to determine the accuracy of implementing the preset program of variation with time of the principal welding process variables with recording the occurrence of an interruption of fusion before upsetting, the slip of workpieces in the machine clamps, and the deviation of the amount of upsetting from the specified value as a single document for the welded joint.

Another object of the invention is to upgrade the reliability of monitoring the run of the welding process.

Still another object of the invention is to provide issuing of a document on the conformity of the welding process variables with the preset values as a certificate for the welded joint.

Yet another object of the invention is to facilitate location of troubles in operation of a welding machine on the basis of analyzing the output document produced with the aid of the recording device.

The above-mentioned and other objects of the invention are attained by that the apparatus for monitoring the process of continuous resistance flash butt welding in a machine of said type, comprising a current transformer incorporated into the welding transformer primary circuit and connected with an analog transmitter of the welding current and with a digital transmitter of the duration of short-circuits in the welding circuit, having a memory element at the output, an analog voltage transmitter coupled to the welding transformer primary, digital transmitters of the slip of the workpieces being weld-joined with memory elements at the output, installed in the machine clamps, a digital transmitter of the offset of the servo-operated control valve rod relative to the housing of the valve, having a memory element at the output, an analog transmitter of the displacement of the machine's movable column, an analog transmitter of the fusion rate, as well as a device for a digital recording of welding process variables, electrically connected to a first output of a programming device and incorporating series-connected commutator of analog signals, analog-to-digital converter, interface, microprocessor, and digital printer, according to the invention, additionally comprises a set of flip-flops whose number is equal to that of control commands, and univibrators coupled to a fourth output of the programming device an OR-gate whose inputs are electrically coupled via corresponding univibrators to outputs of the set of flip-flops and to a second output of the programming device and whose output is coupled to the triggering input of the interface, and two encoders, and the device for recording additionally comprises an OR-gate which accomplishes an electric coupling of the outputs of the analog-to-digital converter and encoders with the information input of the interface, the inputs of one of the encoders being coupled to the outputs of the digital transmitter of the duration of short-circuits, of the digital transmitters of the slip of the workpieces being weld-joined, and of the digital transmitter of the offset of the servooperated control valve rod with respect to the valve housing, the input of the other encoder being coupled to a third output of the programming device, and the control inputs of both encoders and of the commutator of analog signals being coupled to the address bus of the interface.

The above-described configuration of the proposed apparatus provides for recording both analog and digital data characterizing the welding process and thereby makes it possible to determine the accuracy of implementing the preset program of variation with time of the principal welding process variables. It enhances the reliability of monitoring, since the provision of a circuit incorporating a set of flip-flops and multivibrators enables the transmitters to be interrogated at any desired time moment.

The exact nature of the invention will now be explained in greater detail by way of describing embodiments thereof with reference to the accompanying drawings, in which:

DESCRIPTION OF THE PREFERRED EMBODIMENTS

Figure 1:
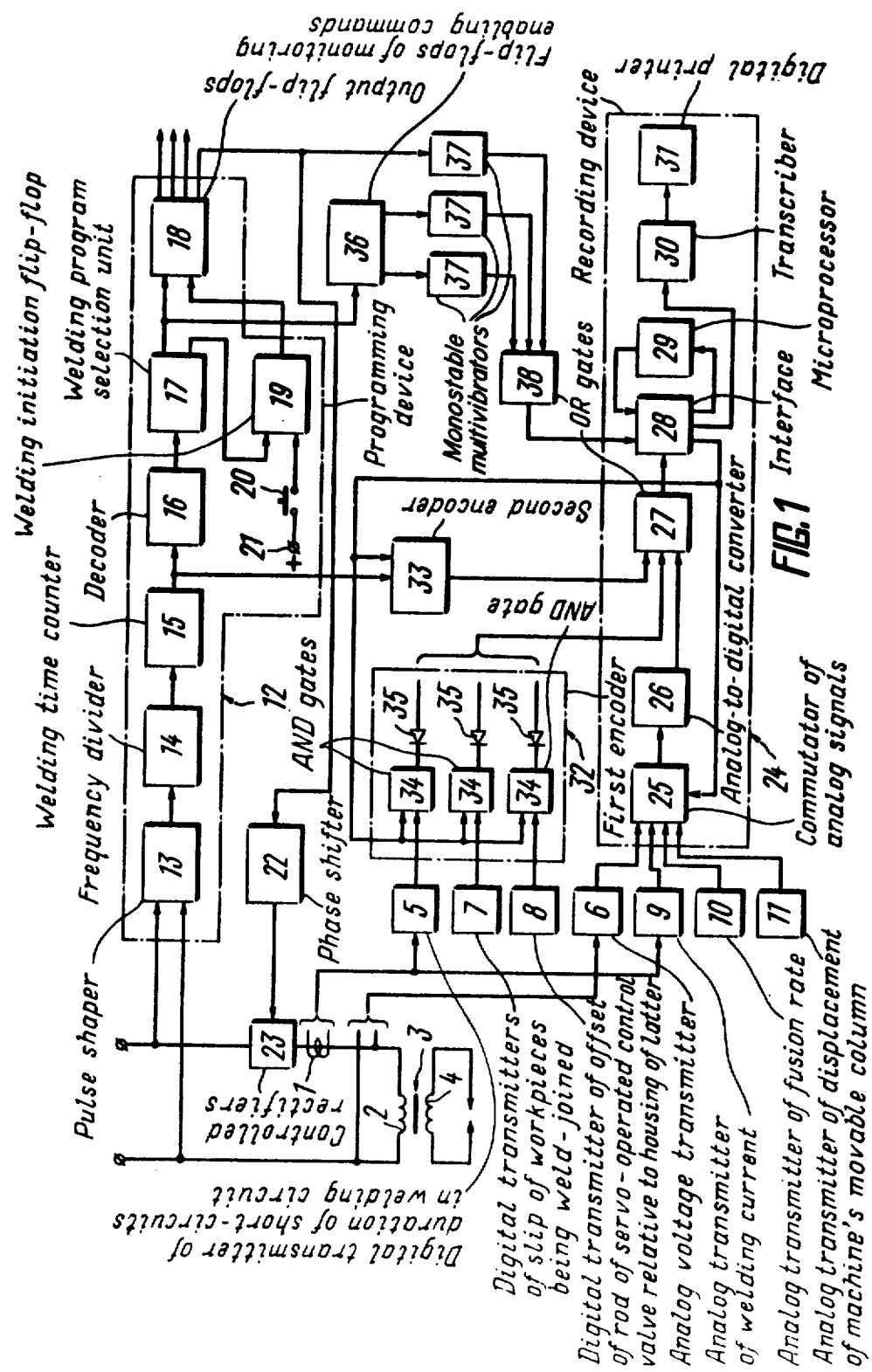
FIG. 1 shows a block diagram of the proposed apparatus.

Referring to FIG. 1, the apparatus for monitoring the welding process in a machine of said type comprises a current transformer 1 incorporated into the circuit of a primary 2 of a welding transformer 3. A secondary 4 of the welding transformer 3 is connected into the welding circuit.

The apparatus of the present invention includes a transmitter 5 of the duration of the short-circuit in the welding circuit, connected to the measuring winding of the current transformer 1. Used as such a transmitter may be a conventional transmitter comprising a measuring channel for monitoring the duration of short-circuit at each fusion stage before upsetting, the measuring channel including a time interval setter, a unit to compare the actual short-circuit duration against the permissible value, and an indicator, all connected in series. A voltage transmitter 6 connected to the primary 2 of the welding transformer 3 is a conventional device, such as a rectifier with a smoothing filter at the output.

Transmitters 7 of the slip of the workpieces being weld-joined are rigidly attached to the clamps of the columns, each transmitter 7 having at its output a linear potentiometer whose slide is mechanically connected to a workpiece being welded.

A transmitter 8 of the offset of the servo-operated control valve rod relative to the housing of the valve is attached to the housing, the rod being mechanically coupled to the slide of the output linear potentiometer of this transmitter. Used as such a transmitter may be, e.g., a transmitter constructed in accordance with the USSR Inventor's Certificate No. 465,292.

A welding current transmitter 9 comprises a detector, a transistorized amplifier, a signal delay element, and an inverter, all electrically connected in series. The input of this transmitter is coupled to the measuring winding of the current transformer 1.

A fusion rate transmitter 10 is as well a conventional device, such as a tachogenerator or, in the simplest case, a passive filter whose input is coupled to armature terminals of the D.C. motor of a servo actuator.

A transmitter 11 of the displacement of the movable column of a machine of said type is a linear potentiometer fed by a D.C. voltage, the potentiometer slide being rigidly attached to the movable column, and the potentiometer housing, to the stationary one.

The machine of said type employs a programming device, mentioned above and shown in FIG. 1 in greater detail to illustrate its electrical connections with the elements of the structure of the proposed apparatus for monitoring the welding process and to explain their functions. A programming device 12 comprises a shaper 13 of pulses synchronized with the voltage across the primary 2 of the welding transformer 3. The output of the pulse shaper is via a frequency divider 14 coupled to a binary-decimal welding time counter 15 which usually is a three-digit one. The output of the counter 15 is via a decoder 16 coupled to a welding program selection unit 17 whose output is coupled to one input of a set of output flip-flops 18, the outputs of the latter being coupled to actuators of the machine of said type. The programming device 12 also comprises a welding initiation flip-flop 19 whose one input is coupled to another output of the welding program selection unit 17 and whose other input is intended to receive a control signal produced by the operator by means of a WELDING pushbutton 20. When the pushbutton 20 is depressed, an appropriate positive voltage from a source 21 is applied to the other input of the flip-flop 19, causing the latter to change its state. The output of the flip-flop 19 is coupled to another input of the set of the output flip-flops 18.

One of outputs of the set of the output flip-flops 18 serves to transmit a command for varying the voltage across the primary 2 of the welding transformer 3, for which purpose this input is via a phase shifter 22 coupled to controlled rectifiers 23 incorporated into the circuit of the primary 2 of the welding transformer 3.

Along with the above-described programming device 12, the machine of said type comprises also a conventional digital recording device 24 which includes a commutator 25 of analog signals incoming from the transmitters 6, 9, 10, and 11. The output of the commutator is via an analog-to-digital converter 26 coupled to one input of a newly introduced OR-gate 27 whose remaining inputs are coupled to other new elements of the proposed apparatus, which will be described below. The output of the OR-gate 27 is via an interface 28 coupled to a microprocessor 29. The interface 28 is also coupled via a transcriber 30 to a digital printer 31.

Apart from the above-mentioned OR-gate 27, the apparatus, according to the invention, comprises a first encoder 32 and a second encoder 33 of digital information. Each of the encoders comprises several circuits formed by AND-gates 34 and diodes 35 coupled to outputs of the gates. Some inputs of the AND-gates 34 of the first encoder 32 are coupled to the address bus of the interface, while other inputs thereof are coupled to outputs of the transmitters 5, 7, 8 in such a manner that the output signal of each of the transmitters passes to an input of the encoder 32 through a circuit consisting of one of the AND gates 34 and one of the diodes 35. The encoder 33 has a similar configuration. One of inputs of its AND-gate is coupled to said address bus of the interface 28, and the other input, to the output of the welding time counter 15. The outputs of both encoders are coupled to corresponding inputs of the OR-gate 27.

The apparatus of the invention includes also a set 36 of monitoring enabling command flip-flops. The input of this set of flip-flops is coupled to the output of the welding program selection unit 17. The output of said set 36 of flip-flops and the output of the set of the output flip-flops 18, coupled to the phase shifter 22, are via monostable multivibrators 37 and an OR-gate 38 coupled to the triggering input of the interface 28.

It should be pointed out that the set 36 of monitoring enabling command flip-flops jointly with the set of the output flip-flops 18 provides for delivery of commands enabling a measurement of welding process variables at time moments matched with the program of variation of the variables, selected by means of the unit 17. The monostable multivibrators 37 jointly with the OR-gate 38 are intended to shape pulses which set the digital recording device 24 in operation, the number of the monostable multivibrators 37 being defined by the number of measurements per a welding cycle. The OR-gate 27 is intended to transmit to a buffer register of the interface 28 both discrete input signals and analog input signals converted by the analog-to-digital converter 26 to a binary-decimal code.

The first information encoder 32 serves to generate a three-digit number whose each digit indicates the state ("0" or "1") of the memory element of the transmitter 5 of the duration of the short-circuit in the welding circuit, of the transmitters 7 of the slip in the column clamps of the workpieces being weld-joined, and of the transmitter 8 of the offset of the servo-operated control valve rod relative to the valve housing respectively; a "0" indicates that the variables under monitoring are within permissible limits, while a "1" indicates a deviation of the variables beyond the permissible limits.

The second encoder 33 is similar in the structure to the first one and is intended to generate a three-digit number (hundreds, tens, and unities of seconds) corresponding to the running value of the welding time.

The operation of the proposed apparatus is basically similar to that of the prior art one, but it should be pointed out that in welding with a programmed voltage reduction, at time moments which do not correspond to voltage switching it is triggered by commands delivered from the output of the set 36 of flip-flops. In particular, the transmitters are interrogated immediately before switching-on of upsetting (final values of process variables in fusion and duration of short-circuits are recorded) and on completion of upsetting (the final position of the movable column, the occurrence of a slip of the workpieces in the clamps, and the deviation of the amount of upsetting from the permissible one are recorded).

It should as well be pointed out that signals incoming from the digital transmitters 5, 7, 8 are recorded as a result of that a signal corresponding to the address of a transmitter being interrogated comes from the address bus of the interface 28 to the input of the encoder 32. If at the output of the corresponding transmitter there is a signal of deviation (logic "1"), a logic "1" appears also at the output of the encoder 32 and is written into the buffer register of the interface 28. The written information is subsequently via the transcriber 30 applied to the digital printer 31.

Figure 2:
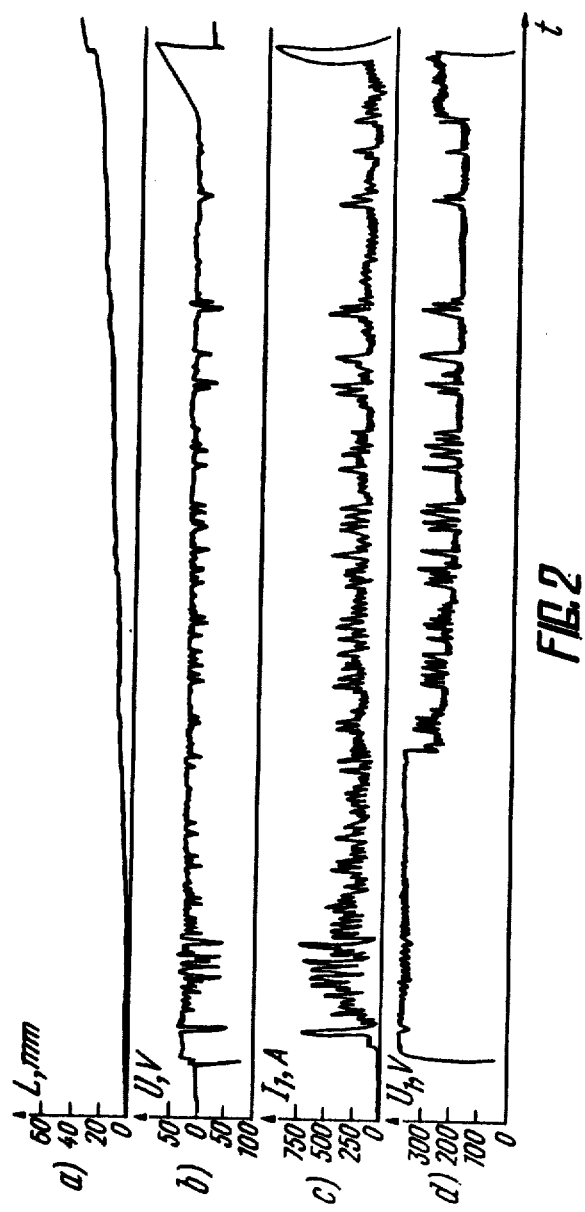
FIG. 2 shows a record of an actual variation of welding process variables.

FIG. 2 presents an example of a record of welding variables in welding with a programmed voltage reduction on a recorder chart. FIG. 2a shows the record of the displacement L of the machine's movable column; FIG. 2b, the record of the voltage U across the armature terminals of a D.C. motor; FIG. 2c, the record of the current $I_1$ in the welding transformer primary; and FIG. 2d, the record of the voltage $U_1$ across the welding transformer primary.

In FIG. 2d, the interval of 0 to 45 s corresponds to the initiation of the workpiece fusion process at a high voltage; of 45 to 84 s, to fusion of the workpieces with a programmed voltage reduction; of 84 to 128 s, to the process of fusion at a low voltage; and of 128 to 146 s, to the final stage of fusion, during which the speed of displacement of the movable column of the machine of said type increases with a simultaneous rise of the voltage across the welding transformer primary.

An example of an actual record of welding process variables being monitored is presented below.

| Welding duration, s | $U_1$, V | $I_1$, A | U, V × $10^{-1}$ | L, mm × $10^{-1}$ | Short-circuit | Slip | Deviation of amount of upsetting |
|---|---|---|---|---|---|---|---|
| 000 | 377 | 026 | 249 | 002 | 0 | 0 | 0 |
| 040 | 377 | 214 | 247 | 078 | 0 | 0 | 0 |
| 045 | 257 | 243 | 234 | 082 | 0 | 0 | 0 |
| 084 | 211 | 259 | 228 | 168 | 0 | 0 | 0 |
| 128 | 211 | 227 | 240 | 252 | 0 | 0 | 0 |
| 146 | 320 | 289 | 919 | 318 | 0 | 0 | 0 |
| 147 | 000 | 000 | 000 | 425 | 0 | 0 | 1 |

The above data show the nature of variation of the welding process variables in time. At the final stage of fusion the process has not been interrupted by welding circuit short-circuits whose duration exceeded the permissible values; no slip of the workpieces in the machine clamps has occurred in upsetting; a deviation of the amount of upsetting from the permissible value has been recorded.

Tests of the proposed apparatus conducted by the present inventors have demonstrated that its employment upgrades the reliability of monitoring the state of a machine of said type and the quality of welded joints as well as provides obtaining a rapid information on the conformity of the welding conditions with those preset by the program and printing out the above data as a document certifying the quality of a welded joint.

What is claimed is:

1. Apparatus for monitoring the process of continuous resistance flash butt welding, by a welding machine having a first clamp means for holding the workpieces to a movable column, and second clamp means for holding another workpiece to a stationary column, actuator means having a servo control value and rod for moving said movable column toward said stationary column, a welding transformer having a primary winding, a welding circuit and current transformer and programming means for operating said machine in a preset sequence and time, comprising:

analog means for sensing the welding current, operatively coupled with the primary of said welding transformer;

analog means for sensing the voltage applied to the primary winding of said welding transformer;

digital means for measuring the duration of a short-circuit in the welding circuit, operatively coupled with the primary winding of said welding transformer and maintaining an output signal during the preset time;

digital means for measuring the amount of slip of the workpieces in the clamps, and maintaining an output signal during the preset time, a digital means for measuring the offset of the rod of the servo-operated control valve mechanically coupled to said rod, and maintaining an output signal during the preset time, analog means for measuring the fusion rate, analog means for measuring the displacement of said movable column, means for digital recording the welding process variables, having a commutator of signals incoming from said analog means to sense the voltage, analog means to sense the welding current, analog means to measure the fusion rate, and analog means to measure the displacement of the movable column having a control input and an output, an analog-to-digital converter of the output signal of said commutator of signals, coupled to the output of said commutator, a first OR-gate having a first input coupled to said analog-to-digital converter, second and third inputs and an output, an interface having an information input coupled to the output of said first OR-gate, a triggering input, an address bus coupled to the control input of said commutator of signals, a first output delivering the information for recording, and a second output, a microprocessor operatively coupled with said interface, and a digital printer coupled to the first output of said interface via a transcriber, a first encoder, controlled by a signal produced on the address bus of said interface and generating a numerical code which corresponds to output signals of said digital means to measure the duration of a short-circuit, said digital means to measure the amount of slip, and said digital means to measure the offset of the rod, the output of said first encoder being coupled to the second input of the first OR-gate, a second encoder, controlled by a signal produced on the address bus of said interface and generating a numerical code of the running time of welding in response to a signal incoming from the first output of said programming device, the output of said second encoder being coupled to the third input of the first OR-gate, a second OR-gate having a plurality of inputs and an output coupled to the triggering input of said interface, a set of flip-flops according to the number of control commands, connected with the outputs thereof to a fourth output of said programming means, a plurality of first monostable multivibrators each having an input coupled to one flip-flop of said set of flip-flops, and an output coupled to one of the plurality of inputs of said second OR-gate, and a second monostable multivibrator having an input coupled to a second output of said programming device and an output coupled to one of the plurality of inputs of said second OR-gate.

* * * * *